(12) United States Patent
Smith

(10) Patent No.: US 6,390,480 B1
(45) Date of Patent: May 21, 2002

(54) WINDSHIELD SEAL

(75) Inventor: Michael Robert Smith, Oxford, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 09/494,708

(22) Filed: Jan. 31, 2000

(51) Int. Cl.[7] .............................. F16J 15/02; E06B 7/16; E04C 2/38
(52) U.S. Cl. ....................... 277/630; 277/637; 277/649; 277/921; 49/495.1; 52/716.5
(58) Field of Search ................................ 277/630, 637, 277/644, 648, 649, 921; 49/490.1, 495.1, 440; 52/208, 716.5, 716.2

(56) References Cited

U.S. PATENT DOCUMENTS

| | | | | |
|---|---|---|---|---|
| 3,742,649 A | * | 7/1973 | Dochnahl | |
| 3,783,568 A | * | 1/1974 | Adler et al. | |
| 4,123,100 A | * | 10/1978 | Ellis | |
| 4,405,175 A | * | 9/1983 | Hoffmann | |
| 4,438,609 A | * | 3/1984 | Nielson et al. | |
| 4,488,753 A | * | 12/1984 | Koike | |
| 4,768,319 A | * | 9/1988 | Derner | |
| 4,949,507 A | * | 8/1990 | Vaughan | |
| 5,029,931 A | * | 7/1991 | Asaba et al. | |
| 5,137,323 A | * | 8/1992 | Gross et al. | |
| 5,758,459 A | * | 6/1998 | Koike et al. | |
| 6,030,022 A | * | 2/2000 | Bormann et al. | |

* cited by examiner

*Primary Examiner*—Anthony Knight
*Assistant Examiner*—Vishal Patel
(74) *Attorney, Agent, or Firm*—Foley & Lardner

(57) ABSTRACT

A windshield seal has a base, to be connected to windshield molding. The base is generally parallel to a windshield in a section view. A primary sealing lip is connected at an inboard end of the base, to contact the windshield. A secondary sealing lip is connected to an outboard end of the base, to contact the windshield. The primary sealing lip generally points inboard and toward the windshield and the secondary sealing lip generally points outboard and toward the windshield. An inboard leg is connected to the inboard end of the base, to be positioned outside the windshield molding, the inboard leg being generally perpendicular to the windshield. An outboard leg is connected to the outboard end of the base, to be positioned inside the windshield molding, the outboard leg being generally perpendicular to the windshield.

2 Claims, 2 Drawing Sheets

WINDSHIELD SEAL

BACKGROUND OF THE INVENTION

The invention is directed to an improved windshield seal, more specifically, an improved windshield molding end rubber.

FIG. 1 shows a prior art windshield seal 200. The seal 200 seals and mates to the windshield 102. The arrow in FIG. 1 points in the forward and upward direction of the vehicle (perpendicular to the windshield). The seal 200 includes a base 210 and a sealing lip 220. An adhesive and/or two-sided tape 250 is used to join the seal 200 to windshield molding 104.

SUMMARY OF THE INVENTION

According to one aspect of the invention, there is provided a windshield seal having a base to be connected to windshield molding; a primary sealing lip, connected to the base, to contact a windshield; and a secondary sealing lip, connected to the base, to contact the windshield.

According to another aspect of the invention, there is provided a windshield seal having a base, to be connected to windshield molding. The base is generally parallel to a windshield in a section view. A primary sealing lip is connected at an inboard end of the base, to contact the windshield. A secondary sealing lip is connected to an outboard end of the base, to contact the windshield. The primary sealing lip generally points inboard and toward the windshield and the secondary sealing lip generally points outboard and toward the windshield. An inboard leg is connected to the inboard end of the base, to be positioned outside the windshield molding, the inboard leg being generally perpendicular to the windshield. An outboard leg is connected to the outboard end of the base, to be positioned inside the windshield molding, the outboard leg being generally perpendicular to the windshield.

DETAILED DESCRIPTION OF A PREFERRED EMBODIMENT

Figure 1:
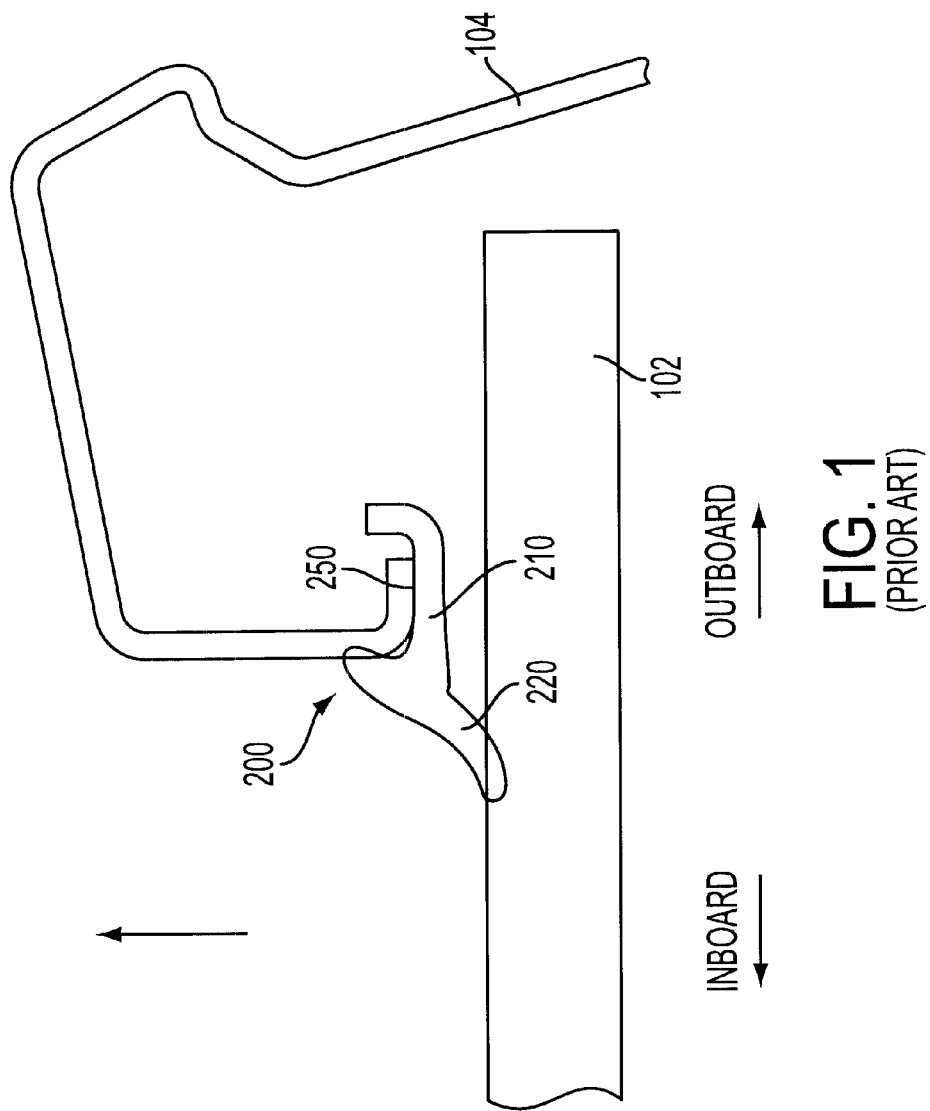
FIG. 1 shows a section view of a prior art windshield seal.

The prior art design (such as shown in FIG. 1) has certain problems which have been recognized and solved by the inventor.

With the prior art design, the windshield 102 causes the seal to twist (or rock). The stressed adhesive, over time, becomes loose and this weakens the integrity of the assembly. Eventually the seal 200 can become separated from molding 104.

Figure 2:
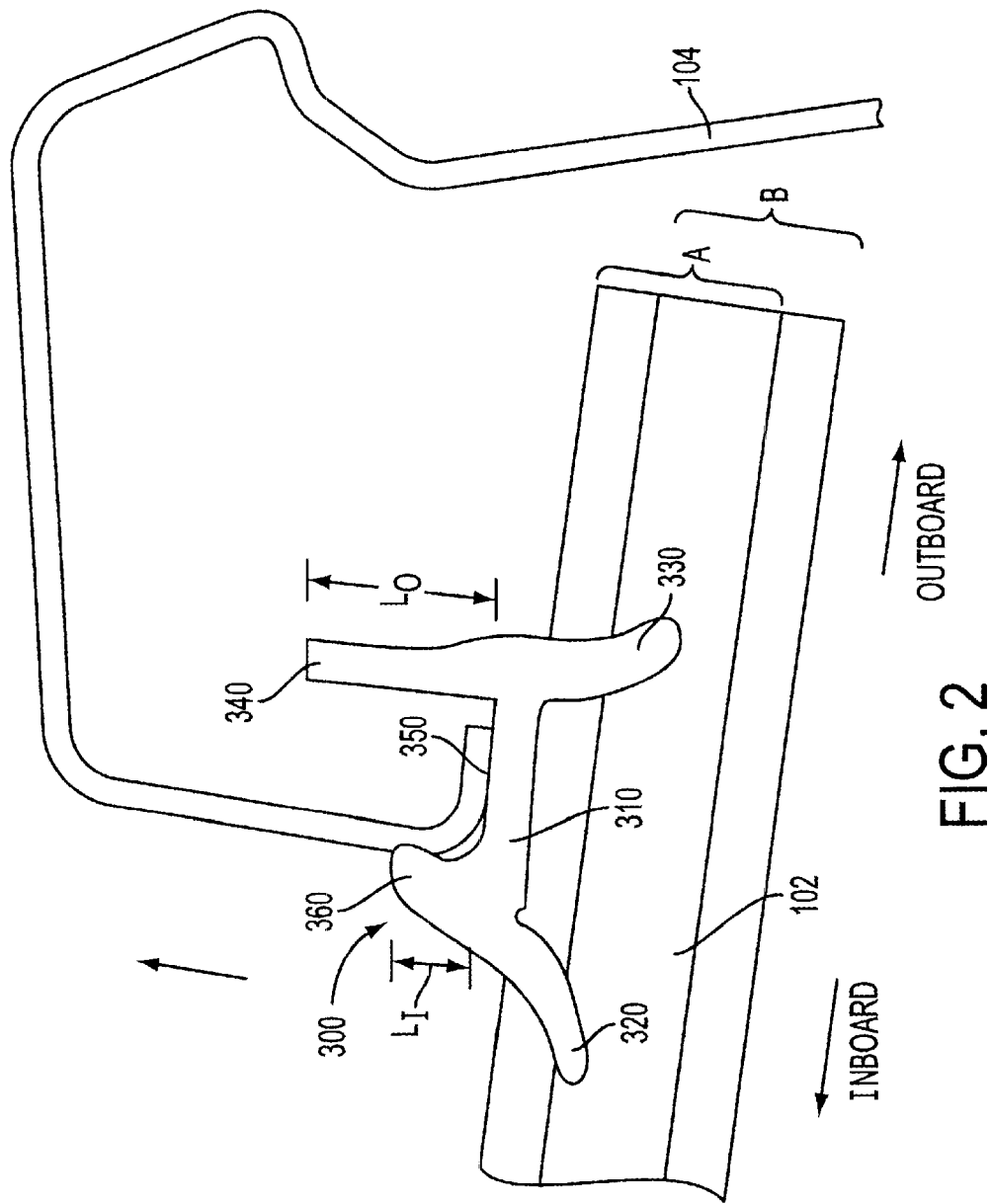
FIG. 2 shows a section view of a windshield seal according to one embodiment of the invention.

FIG. 2 illustrates a seal 300 according to the invention. The seal 300 includes a base 310, a primary (or inboard) sealing lip 320, and an inboard leg 360. The base 310 is attached to molding 104 by, for example, adhesive or two-sided tape 350. The seal 300 also includes a secondary (or outboard) sealing lip 330. The primary sealing lip 320 generally points to a center of the windshield 102 and the secondary sealing lip 330 generally points away from the center of the windshield.

The seal 300 also includes an outboard leg 340. In the FIG. 2 embodiment, the length of leg 340 (called $L_0$ in FIG. 2) exceeds the length $L_1$ of leg 360. The length of leg 340 is made as long as practical (in light of manufacturing concerns and ensuring that the outside leg fits inside the molding 104) to provide as much seal mass (or seal volume) as possible inside of the molding 104. Providing more seal mass inside of the molding 104 makes it harder for the seal 300 to become pulled out from between the molding 104 and the windshield 102. (Because of assembly tolerance the windshield 102 may be located between positions A and B.) The seal 300 can be made out of rubber or any of the materials used for seals. In the FIG. 2 embodiment, all of the parts of seal 300 are made of the same material. However, the seal can be formed from more than one extrusion.

The addition of the secondary sealing lip 330 provides an equal distribution of force (by the windshield) on the seal, which in turn prevents the seal 300 from twisting and coming off of the windshield molding 104.

The invention is not limited to the specific example of the invention set forth above. Variations and modifications of the example set forth above will occur to those in the field. Such variations and modifications are within the spirit and scope of the invention. Accordingly, the invention is defined with reference to the following claims.

I claim:

1. A windshield seal, comprising:
   a base to be connected to windshield molding;
   a primary sealing lip, connected to the base, to contact a windshield;
   a secondary sealing lip, connected to the base, to contact the windshield;
   an inboard leg, connected to the base, to be positioned outside the windshield molding; and
   an outboard leg, connected to the base, to be positioned inside the windshield molding, wherein a length of the outboard leg in a direction perpendicular to the windshield exceeds a length of the inboard leg in the direction perpendicular to the windshield.

2. A windshield seal, comprising:
   a base, to be connected to a windshield molding, the base being generally parallel to a windshield in a section view;
   a primary sealing lip, connected at an inboard end of the base, to contact the windshield;
   a secondary sealing lip, connected to an outboard end of the base, to contact the windshield;
   the primary sealing lip generally pointing inboard and toward the windshield and the secondary sealing lip generally pointing outboard and toward the windshield,
   an inboard leg, connected to the inboard end of the base, to be positioned outside the windshield molding, the inboard leg being generally perpendicular to the windshield; and
   an outboard leg, connected to the outboard end of the base, to be positioned inside the windshield molding, the outboard leg being generally perpendicular to the windshield,
   wherein a length of the outboard leg in a direction perpendicular to the windshield exceeds a length of the inboard leg in the direction perpendicular to the windshield.

* * * * *

UNITED STATES PATENT AND TRADEMARK OFFICE
CERTIFICATE OF CORRECTION

PATENT NO. : 6,390,480 B1
DATED : May 21, 2002
INVENTOR(S) : Michael Robert Smith It is certified that error appears in the above-identified patent and that said Letters Patent is hereby corrected as shown below:

<u>Column 2,</u>
Line 45, delete "scaling", replace with -- sealing --

Signed and Sealed this

Tenth Day of June, 2003

JAMES E. ROGAN
*Director of the United States Patent and Trademark Office*